United States Patent [19]

Yukuta et al.

[11] 4,098,732
[45] Jul. 4, 1978

[54] PROCESS FOR PRODUCTION OF FLAME-RESISTANT AND SMOKE-RETARDANT POLYURETHANE FOAMS

[75] Inventors: Toshio Yukuta, Kodaira; Takashi Ohashi, Iruma; Minoru Kojima, Kodaira; Masumi Saito, Tanashi, all of Japan

[73] Assignee: Bridgestone Tire Co., Ltd., Tokyo, Japan

[21] Appl. No.: 663,143

[22] Filed: Mar. 2, 1976

Related U.S. Application Data

[63] Continuation of Ser. No. 535,280, Dec. 23, 1974, abandoned.

[30] Foreign Application Priority Data

Dec. 25, 1973 [JP] Japan .................................. 48-143692

[51] Int. Cl.$^2$ ...................... C08G 18/32; C08G 18/66; C08G 18/22; C08G 18/14
[52] U.S. Cl. .................................... 521/125; 521/167; 521/176; 521/903
[58] Field of Search ................ 260/2.5 AB, 2.5 AM, 260/2.5 AJ

[56] References Cited

U.S. PATENT DOCUMENTS

| | | | |
|---|---|---|---|
| 3,342,757 | 9/1967 | Considine | 260/2.5 AB |
| 3,591,561 | 7/1971 | Kazama | 260/2.5 AM |
| 3,718,611 | 2/1973 | Maxey | 260/2.5 AJ |
| 3,738,953 | 6/1973 | Anorga | 260/2.5 AJ |
| 3,772,222 | 11/1973 | Steward | 260/2.5 AJ |
| 3,803,064 | 4/1974 | Fishbein | 260/2.5 AM |
| 3,856,718 | 12/1974 | Taub | 260/2.5 AM |
| 3,862,879 | 1/1975 | Barron | 260/2.5 AM |
| 3,891,579 | 6/1975 | Cenker | 260/77.5 MA |
| 3,907,721 | 9/1975 | Gurgiolo | 260/2.5 AM |
| 3,943,075 | 3/1976 | Fishbein | 260/2.5 AB |

OTHER PUBLICATIONS

"Technical Data on Quadrol ®", Wyandotte Chemicals Corp.; pp. 1 to 6, Dec. 1, 1959.

*Primary Examiner*—C. Warren Ivy
*Attorney, Agent, or Firm*—Brooks, Haidt, Haffner & Delahunty

[57] ABSTRACT

A flame-resistant and smoke-retardant polyurethane foam is produced by reacting a polyisocyanate with a polyhydroxyl compound in the presence of an alkaline earth metal salt of a carboxylic acid and a foaming agent.

16 Claims, No Drawings

PROCESS FOR PRODUCTION OF FLAME-RESISTANT AND SMOKE-RETARDANT POLYURETHANE FOAMS

This is a continuation of application Ser. No. 535,280 filed Dec. 23, 1974, and now abandoned.

BACKGROUND OF THE INVENTION

1. Field of the Invention

The present invention relates to a process for production of a flame-resistant and smoke-retardant polyurethane foams.

2. Description of the Prior Art

It is well known to produce polyurethane foams by using polyhydroxyl compound, polyisocyanate, water and/or other foaming agents a catalysts, a foam stabilizer and the like.

Various foams such as flexible, semi-rigid and rigid polyurethane foams have been produced depending upon number of functional groups, molecular weight, main chain structure and the like, of the polyhydroxyl compound and the polyisocyanate.

These foams are broadly used as a seat or cushion for furniture, cars, airplanes and ships, material for clothes and building and the like.

A flame-resistant polyurethane foam is required for the above applications, and various methods imparting flame-resistance to the polyurethane have been researched. However, known methods that is, methods using a flame-resistant agent of the addition type or reaction type such as phosphorus compounds, combination of halogen and phosphorus compounds, and a metal oxide such as antimony oxide and the like can impart flame-resistance to some extent, but the polyurethane foam thus obtained generates much smoke upon burning. The polyurethane foam containing a ring structure such as an isocyanurate ring structure or an imide ring structure is not easily decomposed by heat due to its heat resistant ring structure. Therefore, using such ring structure is one of the effective methods for imparting flame-resistance, but said foam is apt to become rigid polyurethane foam generates much smoke in burning. Accordingly, said polyurethane foam can not be simultaneously flame-resistant and smoke-retardant.

In view of the use of polyurethane foams, it is strongly desired to use polyurethane foams having flame-resistance, smoke-retardation and low poisonous character, particularly for cars, buildings and furniture.

Heretofore, as a catalyst for preparation of polyurethane foam, an organic tin compound or a tertiary amine compound has been usually used, but an alkaline earth metal compound has not been used at all. For example, J. W. Britain and P. G. Gemeinhardt: Journal of Applied Polymer Science, 4, 207–211(1960) discloses that an alkaline earth metal compound such as a compound of barium, magnesium, calcium or strontium is hardly effective as a catalyst. Accordingly, the catalytic behavior of alkaline earth metal compounds has not been investigated.

There are the following two kinds of the catalytic activities for polyurethane foaming reactions. One is a catalytic activity for chain extension and gelation reaction including formation of a urethane bond or urea bond by reacting a polyisocyanate compound with a polyhydroxyl compound having a active hydrogen or water, and formation of an allophanate bond or buiret bond by reacting the above mentioned urethane or urea bond with a polyisocyanate compound. The other is a catalytic activity for foaming reaction accompanied by generating carbon dioxide gas by reacting the polyisocyanate compound with water. The term "catalytic activity" for urethane foaming reactions refers to the effectiveness for both of the above-mentioned reactions.

Many conventional catalysts for polyurethane foaming are effective usually in only one of the gelation reaction and the foaming reaction and therefore, several catalysts are used in combination rather than alone.

SUMMARY OF THE INVENTION

According to the present invention, there is provided a process for the production of a flame-resistant and smoke-retardant polyurethane foam which comprises reacting, in the presence of an alkaline earth metal salt of carboxylic acid and foaming agents, a polyisocyanate with a polyhydroxyl compound selected from the group consisting of:

a. a polyol containing more than 50% primary hydroxyl groups and having a number average molecular weight equal to or more than 3000;

b. a mixture of a polyol containing more than 50% primary hydroxyl groups and having a number average molecular weight equal to or more than 3000 and a low molecular weight polyhydroxyl compound; and c. a mixture of a polyol containing more than 50% secondary hydroxyl groups and having a number average molecular weight equal to or more than 3000 and a low molecular weight polyhydroxyl compound, and in (b) and (c) above the equivalent weight ratio of the low molecular weight polyhydroxyl compound to polyol ranging from 0.5 to 2.0.

An object of the present invention is to provide polyurethane foams which are smoke-retardant as well as flame-resistant.

Another object of the present invention is to provide polyurethane foams having improved flame-resistance and smoke-retardance.

A further object of the present invention is to provide a less poisonous process for producing polyurethane foams.

Still another object of the present invention is to provide flame-resistant and smoke-retardant polyurethane foams which do not generate poisonous gas when placed in a high temperature atmosphere.

DETAILED DESCRIPTION OF THE PREFERRED EMBODIMENTS

As representative salts of the alkaline earth metals in Group II of the Periodic Table of carboxylic acids, there may be mentioned barium, magnesium, calcium and strontium salts of a lower aliphatic carboxylic acid, a higher aliphatic carboxylic acid, an aliphatic carboxylic acid having an unsaturated bond or a hydroxyl group, an aromatic carboxylic acid and the like.

Among alkaline earth metal salts of lower and higher aliphatic carboxylic acids used in the present invention may be included, for example, barium, magnesium, calcium and strontium salts of a saturated aliphatic carboxylic acid such as formic acid, acetic acid, propionic acid, n-butyric acid, iso-butyric acid, n-valeric acid, iso-valeric acid, methyl-ethyl acetic acid, trimethylacetic acid, caproic acid, 2-methyl-caproic acid, 2-ethyl caproic acid, keptonic acid, caprylic acid, polargonic acid, capric acid, undecylic acid, lauric acid, myristic acid, palmitic acid, margaric acid, stearic acid and the like.

Among alkaline earth metal salts of an aliphtic carboxylic having an unsaturated bond or a hydroxyl group may be included, for example, barium, magnesium, calcium and strontium salts of oleic acid, linoleic acid, linolenic acid, ricinoleic acid, acrylic acid, methacrylic acid, lactic acid and the like.

Among alkaline earth metal salts of an aromatic carboxylic acid may be included, for example, barium, magnesium, calcium and strontium salts of benzoic acid, toluic acid, salicylic acid, cinnamic acid and the like. The other alkaline earth metal salts of a carboxylic acid are, for example, barium, magnesium, calcium and strontium salts of a petroleum series carboxylic acid such as naphthenic acid, maleic acid, tartaric acid and the like, and those of polycarboxylic acids.

Among them, a barium salt of an aliphatic carboxylic acid such as barium acetate, barium 2-ethyl caproate, barium stearate and the like is preferable, and barium 2-ethyl caproate having a side chain in its structure and easily dissolving in a polyhydroxyl compound is particularly preferable.

In the present invention, the above-mentioned alkaline earth metal salts of a carboxylic acid are sufficiently effective as a catalyst in a chain extending reaction, gelation reaction and foaming reaction even when they are used singly. However, the alkaline earth metal salts of a carboxylic acid may be used simultaneously along with a conventional catalyst such as an organic tin compound and a tertiary amine compound depending upon the nature of the polyhydroxyl compound to be used for the preparation of a polyurethane foam so that the catalytic action of the alkaline earth metal salts of a carboxylic acid can be easily controlled.

The polyhydroxyl compound may be a polyether or polyester having terminal hydroxyl groups which is usually called polyol. The polyether polyol may be usually obtained by addition polymerization of a polyhydroxyl compound such as glycerine, trimethylol propane, pentaerythritol, sorbitol, sucrose and the like, and propylene oxide or ethylene oxide in the presence of an alkaline catalyst, and the polyester polyol may be usually obtained by reacting a dicarboxylic acid such as adipic acid, sebacic acid, phthalic acid, isophthalic acid, terephthalic acid and the like with a polyhydroxyl compound such as ethylene glycol, propylene gylcol, diethylene glycol, glycerine, trimethylol ethane, trimethyl propane and the like. However, the polyol which is suitable for producing the flame-resistant and smoke-retardant polyurethane foam of the present invention is a polyether polyol having a highly active hydroxyl group. The polyhydroxyl compound is at least one selected from the class of (a) a polyol having a number average molecular weight equal to or more than 3000 and containing more than 50% primary hydroxyl groups, (b) a mixture of a polyol having a number average molecular weight equal to or more than 3000 and containing more than 50% primary hydroxyl groups and a low molecular weight polyhydroxyl compound and (c) a mixture of a polyol having a number average molecular weight equal to or more than 3000 and containing more than 50% secondary hydroxyl groups and a low molecular weight polyhydroxyl compound.

The polyol as defined in (a) may be so-called capped polyether, and may be produced as follows. A low molecular weight polyhydroxyl compound such as glycerine, trimethylol propane or pentaerythritol is reacted with propylene oxide or a mixture of ethylene oxide and propylene oxide in the presence of a basic catalyst, and then the resulting product is reacted with ethylene oxide to prepare a polyether polyol containing the desired amount of primary hydroxyl group at the chain terminal thereof. Among the thus obtained capped polyethers, the polyether polyol having a number molecular weight of from 3000 to 6000 prepared by the above reaction using a triol such as glycerine or trimethylol propane is preferably used. When the polyether polyol as defined in (c) such as poly (oxypropylene) triol obtained by reacting propylene oxide with glycerine used for the production of a conventional flexible polyurethane foam is used, the low molecular weight polyhydroxyl compound is simultaneously used and mixed to improve hardness of said polyurethane foam. Among the low molecular polyhydroxyl compounds in (b) and (c) above may be included ethylene glycol, polypropylene glycol, diethylene glycol, butandiol, glycerine, trimethylol propane, triethylol propane, trimethylol ethane, triethylol ethane, pentaerythritol, ethanol amine, diethanol amine, triethanol amine, "Quadrol" polyol, a trademark for N,N,N',N'-tetrakis-(2-hydroxypropyl) ethylenediamine, sold by Wyandotte Chemicals Corporation, Wyandotte, Mich. 1,2,6-hexanetriol, tris-2-hydroxyethyl isocyanurate and the like. It has been found that diethanol amine is particularly preferable for producing a polyurethane foam which is remarkably improved in the flame-resistance and smoke-retardation. Further, the low molecular weight polyhydroxyl compound acts also as a cell crashing agent for the polyurethane foam. The equivalent weight ratio of the low molecular weight polyhydroxy compound to a polyol ranges from 0.5 to 2.0, preferably from 0.8 to 1.2.

The polyisocyanate used in the present invention may be generally tolylene diisocyanate. Tolylene diisocyanate in which the mixing ratio of 2,4-isomer to 2,6-isomer is 80 : 20 or 65 : 35 (ratio by weight) is preferable from the view point of cost and usefulness. Tolylene diisocyanate used in the present invention may be a purified one, a crude one or a mixture thereof. As other polyisocyanates used in the present invention, there may be mentioned diphenylmethane diisocyanate (purified crude, or a mixture thereof), diphenyl diisocyanate, triphenyl diisocyanate, chlorophenyl-2,4-diisocyante, p-phenylene diisocyanate, xylene diisocyanate, polyanilinepolyisocyanate and the like. The polyisocyanate capable of imparting good flame-resistance and smoke-retardation to the polyurethane foam according to the present invention is preferably tolylene diisocyanate.

Water or a volatile liquid having a low boiling point may be used as the foaming agent. As the volatile liquid having a low boiling point, there may be mentioned monofluorotrichloromethane, dibromodifluoromethane, dichlorodifluoromethane, dichlorotetrafluoroethane, monochlorodifluoromethane, trifluoroethylbromide, dichloromethane and the like. The foaming agents may be used singly or in combination.

Polyethylene oxide, phenylether, a blend of esters of polyalcohol and carboxylic acid, oil-soluble sulfonates, siloxane - oxylakylene block copolymer and the analogues thereof may be used as a diffusing agent, an emulsifier or a foam stabilizer in the present invention.

Moreover, the polyurethane foam produced by the process of the present invention may contain a curing auxiliary agent, flame-resistant agent, pigment and the like.

The polyurethane foam of the present invention may be produced by a usual method, for example, so called "one-shot method", in which the polyhydroxyl compound, water, catalyst, and foam stabilizer are mixed to react with the polyisocyanate simultaneously. It is preferable that the specified amount of the catalyst is previously mixed with the polyhydroxyl compound and stirred to form a uniform solution or uniform dispersion. Further, the polyurethane foam may be produced by a "two stage method" in which a part of the polyhydroxyl compound is previously reacted with the whole amount of the polyisocyanate and then other components are mixed with the resulting prepolymer to provide polyurethane foam.

The amount of the alkaline earth metal salts used as a catalyst in the present invention changes depending upon the reaction activity of the polyhydroxyl compound or the polyisocyanate, and is 0.1–5.0 parts by weight per 100 parts by weight of the polyhydroxyl compound and is preferably 0.5–2.5 parts. Since the alkaline earth metal salt of a carboxylic acid is expected to act effectively as a capturing agent of poisonous gas such as hydrogen cyanide and the like generated upon burning the polyurethane foam, said salt may be preferably used as much as possible as far as the foaming is not adversely affected. However, since a scorching phenomenon may appear in the resulting polyurethane foam when a large amount of the alkaline earth metal salt of a carboxylic acid is added, the foaming reaction is required to be appropriately controlled by changing the amount of water or volatile liquid having a low boiling point used as the foaming agent so as to prevent the scorching from occurring. The isocyanate index is the amount of the polyisocyanate to the whole amount of the polyhydroxyl compound and the other compounds having active hydrogen. In the present invention, the isocyanate index is generally from 80 to 130. The preferable range of the isocyanate index from a point of view of flame-resistance and smoke-retardation of the polyurethane foam is from 90 to 110, and further the preferable range of the isocyanate index for imparting immproved physical properties to the polyurethane foam is from 95 to 105.

The amount of polysiloxane such as dimethyl polysiloxene or siloxane - oxyalkylene block copolymer used as the foam stabilizer may be 0.05–0.5 parts by weight to 100 parts by weight of the polyhydroxyl compound, and is preferably 0.05–0.2 parts by weight since the flame-resistance tends to decrease as the amount of polysiloxane increases.

The polyurethane foam obtained in the present invention is generally a flexible polyurethane foam, which has density of from 20 Kg./m³. to 50 Kg./m³., and if desired, the density can be controlled by adding water or other foaming agents or a low molecular weight polyhydroxyl compound or by using a selected polyol or polyisocyanate.

The following examples are given merely as illustrations of the present invention and it is to be understood that the invention is not limited thereto.

EXAMPLE 1

To 100 g. of poly(oxypropylene) poly(oxyethylene) triol (hydroxyl number, 36; the number average molecular weight, about 5000; the proportion of the primary hydroxyl groups in the polyol, 60–70%; trade mark, FA-703 supplied by Sanyo Chemical Industries Ltd.) was added 5 g. of barium 2-ethyl caproate, mixed thoroughly and dissolved uniformly. Then, 0.05 g. of polysiloxane (trade mark, L-5305, supplied by Union Carbide Corporation) and 4.5 g. of water were added thereto and stirred for about 30 seconds, and 51.1 g. of tolylene diisocyanate [2,4-isomer/2,6-isomer=80/20 (weight ratio)] was added and agitated at high speed and the reaction was emulsified in 8 seconds to become creamy. Immediately, it was discharged into an open paper mold of 12 × 18 × 16 cm. size and then the mixture began to foam.

The rising of foam was completed in 90 seconds.

The flexible polyurethane foam obtained as described above was elastomeric having stable and uniform cell structure with a small proportion of closed cells and provided completely open cell-type foam after crushing process.

The resulting foam had a density of 28.3 Kg./m³ and was self-extinguishing according to ASTM D-1692-59T burning test.

EXAMPLE 3

A flexible polyurethane foam was prepared by repeating the procedure of Example 1 except that 2.0 g. of barium 2-ethyl caproate, 5.0 g. of diethanol amine and 59.6 g. of tolylene diisocyanate were used.

In this case, the cream time, i.e. the period of time during which the reactant becomes creamy, was about 5 seconds and the rise time, i.e. the period of time during which the rising of foam was completed, was about 50 seconds.

The foam thus obtained had a density of 24.5 Kg./m.³ and was self-extinguishing according to ASTM D-1692-59T burning test.

The smoke generation coefficient $C_A$ according to JIS-A-1321-1970 (The smaller the value of this coefficient, the less the smoke generation) was 26.8 when converted to a basis of 30.0 Kg./m.³ of foam density.

COMPARATIVE EXAMPLE 1

A polyurethane foam was prepared by repeating the procedure of Example 2 except that trielhylene diamine, a conventional catalyst for polyurethane foam production, was used in place of barium 2-ethyl caproate.

The flexible polyurethane foam thus obtained was self-extinguishing, but had a smoke generation coefficient $C_A$ of 37.5 and it was concluded that the foam thus obtained by the present invention was superior to that of this example with respect to smoke generation.

EXAMPLES 3–5

Foaming was effected by repeating the procedure of Example 1 except that the amounts of water and diethanol amine were changed as shown in Table 1.

All of the flexible polyurethane foams obtained by Examples 3–5 were self-extinguishing according to ASTM D-1692 -59T burning test and showed lower values of the smoke generation coefficient $C_{A\ max}$ according to JIS A-1321-1970 than that of polyurethane foam obtained by the same recipe except that the conventional tertiary amine catalyst was used instead of the catalyst of the present invention.

Table 1

| Example Nos. | Example 3 | Example 4 | Example 5 |
|---|---|---|---|
| Barium 2-ethyl caproate (wt. part) | 2.0 | 2.0 | 2.0 |
| Water (wt. part) | 3.5 | 3.0 | 3.0 |
| Diethanol amine | 5.0 | 5.0 | 2.5 |

Table 1-continued

| Example Nos. | Example 3 | Example 4 | Example 5 |
|---|---|---|---|
| (wt. part) | | | |
| Cream time (sec.) | 5 | 6 | 8 |
| Rise time (sec.) | 78 | 67 | 132 |
| Density (Kg./m.$^3$) | 30.2 | 40.4 | 34.4 |
| Smoke generation coefficient $C_{A\ max}$ | 35.2 | 33.4 | 20.9 |

EXAMPLES 6-7

Flexible polyurethane foams were prepared by repeating the procedure of Example 1 except that barium salts of carboxylic acids as shown in Table 2 were used instead of barium 2-ethyl caproate.

All of the foams thus obtained were self-extinguishing according to ASTM D-1692-59T burning test.

Table 2

| | Example 6 | Example 7 |
|---|---|---|
| Catalyst | barium acetate | barium stearate |
| Cream time (sec.) | 16 | 16 |
| Rise time (sec.) | 165 | 200 |

EXAMPLES 8-15

The flexible polyurethane foams were prepared by repeating the procedure of Example 1 except that the binary catalyst system of barium 2-ethyl caproate and a well known catalyst as shown in Table 3 was used in place of barium 2-ethyl caproate above. It was observed that the cell structure of the resulting foam was more uniform and stable and further the tack-free nature of the foam was improved by using the binary systems consisting of the catalyst of the present invention and the conventional catalyst.

All of the foams thus obtained were self-extinguishing according to ASTM D-1692-59T burning test.

Table 3

| | Ex. 8 | Ex. 9 | Ex. 10 | Ex. 11 | Ex. 12 | Ex. 13 | Ex. 14 | Ex. 15 |
|---|---|---|---|---|---|---|---|---|
| Barium 2-ethyl caproate | 4.0 | 4.0 | 4.0 | 4.0 | 4.0 | 4.0 | 4.0 | 4.0 |
| Stannous octoate | 0.1 | 0.4 | | | | | | |
| Dibutyl tin dilaurate | | | 0.1 | 0.4 | | | | |
| Triethylenediamine | | | | | 0.1 | 0.4 | | |
| A - 1 | | | | | | | 0.1 | 0.4 |
| Cream time (sec.) | 10 | 8 | 11 | 11 | 11 | 11 | 10 | 5 |
| Rise time (sec.) | 90 | 70 | 98 | 100 | 98 | 80 | 90 | 60 |

The catalyst A - 1, above is a mixture of 70% bis-($\beta$-dimethylaminoethyl)-ether and 30% dipropylene ether. The amounts are shown in grams.

EXAMPLES 16-21

The flexible polyurethane foams were prepared by repeating the procedure of Example 1 except that various kinds and amounts of low molecular weight polyhydroxyl compounds as shown in Table 4 were used.

All of the foams thus obtained were good elastomeric one having an improved hardness. All of the foams except one obtained in Example 19 were self-extinguishing according to ASTM D-1692-59T burning test.

It is clear from the results of Examples 16-21 that the amount of triethanol amine to be added to the catalyst of the present invention should be less than 5.0 parts by weight for the production of a self-extinguishing polyurethane foam.

Table 4

| | Ex. 16 | Ex. 17 | Ex. 18 | Ex. 19 | Ex. 20 | Ex. 21 |
|---|---|---|---|---|---|---|
| Barium 2-ethyl caproate | 4.0 | 4.0 | 4.0 | 4.0 | 4.0 | 4.0 |
| Diethanol amine | 2.5 | 5.0 | | | | |
| Triethanol amine | | | 2.5 | 5.0 | | |
| 1,4-Butane diol | | | | | 2.5 | 5.0 |
| Cream time (sec.) | 8 | 5 | 12 | 11 | 16 | 9 |
| Rise time (sec.) | 90 | 75 | 90 | 76 | 100 | 81 |

EXAMPLE 22

To a homogeneous solution obtained by dissolving 40 g. of barium 2-ethyl caproate in 100 g. of poly (oxypropylene) poly (oxyethylene) triol (hydroxyl value, 56; the number average molecular weight, ca. 3000; the proportion of primary hydroxyl group in the polyol, 62%; trade mark, PROPYLAN 333 supplied by Dai-Ichi Kogyo Seiyaku Kabushiki Kaisha) were added 0.05 g. of polysiloxane (trade mark, L-5305, supplied by Union Carbide Corporation) and 4.5 g. of water and the resulting mixture was agitated for about 30 seconds.

Then, 54.4 g. of tolylene diisocyanate (2,4-isomer/2,6-isomer = 80/20) was added and the mixture was subjected to high speed mixing to obtain flexible polyurethane foam having homogeneous cell structure, which cream time was 13 seconds and rise time was 120 seconds.

The resulting foam had the density of 19.4 Kg./m.$^3$ and was self-extinguishing according to ASTM D-1692-59T burning test.

EXAMPLE 23

A flexible polyurethane foam was prepared by repeating the procedure of Example 22 except that 100 g. of poly (oxypropylene) triol (hydroxyl value, 56; the number average molecular weight, ca. 3000; and all of the groups were secondary hydroxyl trade mark, GP-3000, supplied by Sanyo Chemical Industries Ltd.), 5.0 g. of trimethylol propane and 63.8 g. of tolylene diisocyanate (2,4-isomer/2,6-isomer = 80/20) were employed.

The polyurethane foam having an open cell structure was obtained for which the cream time was 25 seconds and the rise time was 120 seconds.

The foam thus obtained had a density of 36.1 Kg./m.$^3$ and was self-extinguishing according to ASTM D-1692-59T burning test.

EXAMPLES 24-28

A flexible polyurethane foam was prepared by repeating the procedure of Example 1 except that there were used 100 g. of FA-703 (trade mark of poly (oxypropylene) poly (oxyethylene) triol supplied by Sanyo Chemical Industries Ltd.), 3.2 g. of diethanolamine, 0.5 g. of L-5305 (trade mark of polysiloxane supplied by Union Carbide Corporation), 3.0 g. of water, 41.8 g. of tolylene diisocyanate and 2.0 g. of alkaline earth metal of a carboxylic acid as shown in Table 5. All of the flexible polyurethanes thus obtained were self-extinguishing according to ASTM D-1692-59T burning test and had lower values of the smoke generation coefficient $C_{A\ max}$ according to JIS A-1321-1970 than commercially available polyurethane foam.

Table 5

| Catalyst | Ex. 24 Magnesium oleate | Ex. 25 Calcium naphthenate | Ex. 26 Strontium naphthenate | Ex. 27 Barium oleate | Ex. 28 Barium naphthenate |
|---|---|---|---|---|---|
| Cream time (sec.) | 17 | 18 | 15 | 15 | 11 |
| Rise time (sec.) | 360 | 300 | 300 | 300 | 300 |

EXAMPLES 29–30

Flexible polyurethane foams were prepared by repeating the procedure of Example 1 except that the amounts of ingredients were changed as shown in Table 6. The polyurethane foams thus obtained were self-extinguishing according to ASTM D-1692-59T burning test.

Table 6

|  | Example 29 | Example 30 |
|---|---|---|
| Polyether triol FA-703 | 100 | 100 |
| Barium 2-ethyl caproate | 4.0 | 2.0 |
| Water | 3.0 | 3.0 |
| Polysiloxane L-5305 | 0.5 | 0.5 |
| Freon F-11 | 7.0 | 5.0 |
| Glycerine | 3.1 | — |
| Tris-2-hydroxyethyl isocyanurate | — | 4.4 |
| Tolylene diisocyanate | 43.3 | 44.7 |
| Cream time (sec.) | 12 | 15 |
| Rise time (sec.) | 120 | 190 |

We claim:

1. A process for the production of a flame-resistant and smoke-retardant polyurethane foam which comprises reacting, in the presence of an alkaline earth metal salt of aliphatic carboxylic acid and a foaming agent a polyisocyanate with a polyhydroxyl compound selected from the group consisting of
   (a) a mixture of polyol containing more than 50% primary hydroxyl groups and having a number average molecular weight equal to or more than 3,000 and a low molecular weight polyhydroxyl compound; and
   (b) a mixture of polyol containing more than 50% secondary hydroxyl groups and having a number average molecular weight equal to or more than 3,000 and a low molecular weight polyhydroxyl compound, wherein the low molecular weight polyhydroxyl compound is diethanol amine in an equivalent ratio of amine to polyol ranging from 0.5 to 2.0 and the amount of alkaline earth metal salt being from 0.1 to 5.0 parts by weight per 100 parts by weight of the polyhydroxyl compound.

2. The process according to claim 1 in which the polyol containing secondary hydroxyl groups is a polyether polyol obtained by polymerizing propylene oxide or a mixture of ethylene oxide and propylene oxide with a low molecular weight polyhydroxyl and then reacting the resulting product with ethylene oxide.

3. The process according to claim 1 in which the polyol as defined in (c) is a polyether polyol obtained by polymerizing propylene oxide with glycerine.

4. The process according to claim 1, in which the alkaline earth metal salt of carboxylic acid is selected from barium salts, magnesium salts, calcium salts and strontium salts of aliphatic carboxylic acids.

5. The process according to claim 4 in which the alkaline earth metal salt of carboxylic acid is a barium salt of aliphatic carboxylic acid.

6. The process according to claim 5 in which the alkaline earth metal salt of carboxylic acid is barium acetate, barium 2-ethyl caproate and barium stearate.

7. The process according to claim 6 in which the alkaline earth metal salt of carboxylic acid is barium 2-ethyl caproate.

8. The process according to claim 2 in which the polyisocyanate is selected from tolylene diisocyanate, diphenylmethane diisocyanate, diphenyl diisocyanate, triphenyl diisocyanate, chlorophenyl-2,4-diisocyanate, p-phenylene diisocyanate, xylene diisocyanate and polyaniline polyisocyanate.

9. The process according to claim 8 in which the polyisocyanate is tolylene diisocyanate.

10. The process according to claim 1 in which the foaming agent is selected from water, monofluorotrichloromethane, dibromodifluoromethane, dichlorodifluoromethane, dichlorotetrafluoroethane, monochlorodifluoromethane, trifluoroethylbromide and dichloromethane.

11. The process according to claim 1 in which the amount of the alkaline earth metal salt of carboxylic acid is from 0.5 to 2.5 parts by weight per 100 parts by weight of the polyhydroxyl compound.

12. The process according to claim 1 in which the isocyanate index is from 80 to 130.

13. The process according to claim 12 in which the isocyanate index is from 95 to 105.

14. The process according to claim 1 in which the equivalent ratio of low molecular weight polyhydroxyl compound to polyol is from 0.8 to 1.2.

15. The process according to claim 1 in which at least one of a dispersing agent, emulsifier and foam stabilizer is added to the reaction mixture.

16. The process according to claim 2 wherein the polyether polyol is a poly(oxypropylene)poly(oxyethylene) triol.

* * * * *

UNITED STATES PATENT AND TRADEMARK OFFICE
CERTIFICATE OF CORRECTION

PATENT NO.  : 4,098,732
DATED       : July 4, 1978
INVENTOR(S) : TOSHIO YUKUTA ET AL It is certified that error appears in the above-identified patent and that said Letters Patent are hereby corrected as shown below:

Column 1, line 17, insert a comma after "agents"; line 43, insert --and-- after "foam"; line 67, correct the spelling of "biuret".

Column 2, line 65, correct the spelling of "pelargonic".

Column 3, line 1, correct the spelling of "aliphatic".

Column 4, line 44, insert a comma after "purified"; line 62, correct the spelling of "oxyalkylene".

Column 5, line 42, correct the spelling of "improved"; line 45, correct the spelling of "polysiloxane".

Column 6, line 21, change "Example 3" to --Example 2--; line 41, correct the spelling of "triethylene".

Column 10, line 25, change "2" to --1--.

Signed and Sealed this

Fifteenth Day of May 1979

[SEAL]

Attest:

RUTH C. MASON
Attesting Officer

DONALD W. BANNER
Commissioner of Patents and Trademarks